(12) United States Patent
Pineau et al.

(10) Patent No.: US 11,333,057 B2
(45) Date of Patent: May 17, 2022

(54) CAPTIVE SCREW SPRAY NOZZLE

(71) Applicant: BONTAZ CENTRE R & D, Marnaz (FR)

(72) Inventors: Frédéric Daniel Bernard Pineau, Metz-Tessy (FR); Marc Eugène Talotti, Sallanches (FR); Arnaud Guy Sappey, Ayse (FR)

(73) Assignee: BONTAZ CENTRE R & D, Marnaz (FR)

( * ) Notice: Subject to any disclaimer, the term of this patent is extended or adjusted under 35 U.S.C. 154(b) by 344 days.

(21) Appl. No.: 16/621,936

(22) PCT Filed: Jun. 12, 2018

(86) PCT No.: PCT/FR2018/051364
§ 371 (c)(1),
(2) Date: Dec. 12, 2019

(87) PCT Pub. No.: WO2018/229414
PCT Pub. Date: Dec. 20, 2018

(65) Prior Publication Data
US 2021/0148276 A1 May 20, 2021

(30) Foreign Application Priority Data

Jun. 16, 2017 (FR) ...................... 17 55504

(51) Int. Cl.
*F16B 39/10* (2006.01)
*F01P 3/08* (2006.01)
(Continued)

(52) U.S. Cl.
CPC ................. *F01P 3/08* (2013.01); *F01M 1/08* (2013.01); *F16B 39/10* (2013.01); *F01P 2003/006* (2013.01)

(58) Field of Classification Search
CPC .......... F16B 39/08; F16B 39/10; F16B 39/14; F16B 39/24; F16B 39/34; F16B 39/36;
(Continued)

(56) References Cited

U.S. PATENT DOCUMENTS 486,147 A * 11/1892 Woodstock ............. F16B 39/10
411/120
856,658 A * 6/1907 Parsons ................... F16B 39/10
411/120
(Continued)

FOREIGN PATENT DOCUMENTS

CN 105 736 112 A 7/2016
DE 460 832 C 9/1929
(Continued)

OTHER PUBLICATIONS

International Search Report for International Application No. PCT/FR2018/051364 dated Sep. 14, 2018.
(Continued)

*Primary Examiner* — Roberta S Delisle
(74) *Attorney, Agent, or Firm* — Pearne & Gordon LLP

(57) ABSTRACT

A captive screw spray nozzle comprising a screw for holding the spray nozzle on a support, the screw comprising a screw head engaging with a holding member, secured to the spray nozzle, and forming a stop for retaining the captive screw on the spray nozzle.

11 Claims, 5 Drawing Sheets

(51) Int. Cl.
*F01M 1/08* (2006.01)
*F01P 3/00* (2006.01)

(58) Field of Classification Search
CPC ........ F01M 1/08; F01P 3/08; F01P 2003/006; Y10S 411/965
USPC ......................................... 411/116, 119, 120
See application file for complete search history.

(56) References Cited

U.S. PATENT DOCUMENTS

| | | | |
|---|---|---|---|
| 1,460,884 A | | 7/1923 | Boutte |
| 1,470,294 A | * | 10/1923 | Sell .......................... F16B 39/10 |
| | | | 411/120 |
| 3,709,109 A | | 1/1973 | Howe |
| 5,954,466 A | * | 9/1999 | Coffey .................... B25B 27/16 |
| | | | 411/119 |
| 5,971,686 A | * | 10/1999 | Stewart .................. F16B 37/041 |
| | | | 411/113 |
| 8,202,030 B2 | * | 6/2012 | Walton .................. F16B 41/002 |
| | | | 411/119 |
| 2004/0184896 A1 | * | 9/2004 | Tanner .................. F16B 41/002 |
| | | | 411/119 |
| 2015/0068471 A1 | * | 3/2015 | Schneider ............ G05D 7/0126 |
| | | | 123/41.08 |
| 2019/0063274 A1 | * | 2/2019 | Perotto .................... F01M 1/08 |

FOREIGN PATENT DOCUMENTS

| | | |
|---|---|---|
| DE | 10 2013 004519 A1 | 9/2014 |
| FR | 2 061 433 A5 | 6/1971 |
| FR | 2 719 868 A1 | 11/1995 |
| JP | 2002-206516 A | 7/2002 |
| WO | 2017/038756 A1 | 3/2017 |

OTHER PUBLICATIONS

Written Opinion for International Application No. PCT/FR2018/051364 dated Sep. 14, 2018.
Preliminary French Search Report for French Patent Application No. 17 55504 dated Mar. 14, 2018.

* cited by examiner

CAPTIVE SCREW SPRAY NOZZLE

TECHNICAL FIELD

This invention relates to an oil spray nozzle that will be used for example for cooling the pistons of a thermal combustion engine or for lubrication of mechanical parts. In particular, this invention relates to a solution for retaining the oil spray nozzle on a support.

PRIOR ART

A spray nozzle, for example an oil spray nozzle, according to prior art comprises
- a spray nozzle body;
- an orientation plate containing a hole into which the spray nozzle body is inserted;
- a retaining screw.

The retaining screw holds and/or tightens the spray nozzle against a support surface, for example the surface of the casing of an internal combustion engine.

In particular, such a spray nozzle can be used for lubrication of a chain and/or cooling of a piston of an internal combustion engine.

However, the space available in internal combustion engines is very limited, which makes it necessary to preassemble spray nozzles before they are assembled in the engine block.

In order to prevent loss of the retaining screw during assembly of the spray nozzle on the engine block, the screw is generally held captive to the spray nozzle by an O-ring or a foam glue patch.

However, these solutions are not satisfactory.

The costs generated by use of the O-ring or the patch are not compatible with the requirements of the automobile industry.

Furthermore, both the O-ring and the patch can decompose and/or release particles and be harmful to correct operation of the engine.

The purpose of this invention is to disclose a solution for holding the spray nozzle retaining screw in place that does not have the above-mentioned disadvantages.

PRESENTATION OF THE INVENTION

The purpose of this invention is at least partly achieved by a captive screw spray nozzle comprising a screw that will retain the spray nozzle on a support, said screw comprising a screw head cooperating with a retaining element, fixed to the spray nozzle, and forming a stop holding the screw captive on the spray nozzle.

According to one embodiment, the screw head comprises a collar or a groove, the retaining element retaining the screw at said collar.

According to one embodiment, the spray nozzle also comprises a spray nozzle body and an orientation plate, the retaining element and the orientation plate being held together by a fixed connection.

According to one embodiment, the spray nozzle body comprises a metal ring in which there is an axial channel in which the screw is engaged, and the orientation plate comprises a hole in which the spray nozzle body is inserted.

According to one embodiment, the retaining element and the orientation plate form a single-piece element, advantageously the orientation plate comprises a plastic material.

According to one embodiment, the retaining element comprises a clip projecting from an upper face of the orientation plate, the clip comprising a protuberance at a free end arranged to form the stop that will retain the screw captive to the spray nozzle.

According to one embodiment, the orientation plate also comprises two side plates for protection of the clip, projecting from the upper face of the orientation plate and arranged on each side of the clip.

According to one embodiment, the screw is offset from the body of the spray nozzle, and the retaining element comprises a fork forming the stop that will retain the screw captive to the spray nozzle, said fork comprising two arms connected to each other through a base, and surrounding the screw head.

According to one embodiment, the retaining element also comprises a fastening section inserted in a lateral slide formed in the orientation plate, advantageously the fastening section comprises a locking clip arranged to enable a fixed connection between the retaining element and the orientation plate, and even more advantageously, the locking clip cooperates with a pin formed at the slide.

According to one embodiment, the screw is offset from the spray nozzle body, and the retaining element comprises an annular element inside which the screw head is engaged, forming the stop that will retain the screw captive to the spray nozzle.

According to one embodiment, the orientation plate comprises two lateral tabs, and the retaining element also comprises two beams extending from the annular element along two diametrically opposite directions, each of the two beams comprising a free end at which a clip is arranged, each cooperating with one of the two lateral tabs to make the fixed connection between the retaining plate and the retaining element.

According to one embodiment, the orientation plate comprises a lateral tab, said tab, the screw and the spray nozzle body being aligned, and the retaining element also comprises two beams extending from the annular element along two diametrically opposite directions, one of the two beams comprising a free end at which there is a clip cooperating with the lateral tab, the other beam also having a free end at which there is an attachment fork cooperating with a circumferential groove formed on an external surface of the spray nozzle body.

According to one embodiment, the screw is offset from the spray nozzle body, and the retaining element comprises an annular section adapted to be laterally engaged to the screw and forming the stop that will retain the screw captive to the spray nozzle.

BRIEF DESCRIPTION OF THE DRAWINGS

This invention will be better understood after reading the following description and the appended drawings on which.

DETAILED PRESENTATION OF PARTICULAR EMBODIMENTS

Figure 1A:
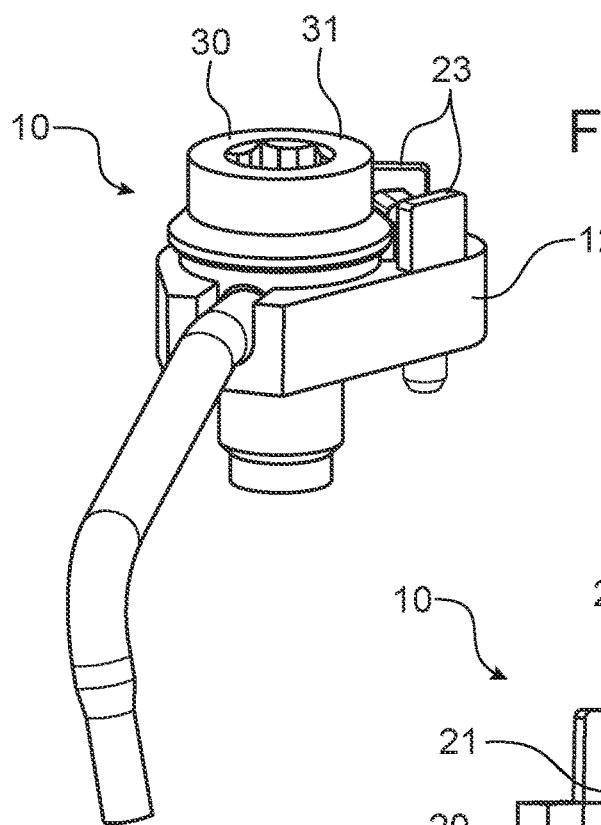
FIGS. 1a and 1b represent a perspective view and a view on a section plane passing through the XX' axis respectively, of a spray nozzle according to a first embodiment of the invention.

This invention discloses a solution to retain a screw 30, for example a tightening screw 30, that will squeeze the spray nozzle in contact with a surface. In particular, the spray nozzle may be an oil spray nozzle held in contact with the surface of the internal combustion engine to lubricate a chain or to cool a piston.

The retaining solution disclosed in this invention is designed to retain the screw 30 captive to the spray nozzle 10 by a stop. The spray nozzle 10 is then provided with a retaining element 20 acting as a stop that will hold the screw 30 captive to the spray nozzle 10. In particular, the retaining element 20 retains the screw 30 at the screw head 31.

Without it being necessary to state it, the retaining element 20 does not hinder tightening of the screw.

According to the invention, the retaining element 20 is fixed to the spray nozzle 10. "Fixed to the spray nozzle 10" means a mechanical part connected to the spray nozzle 10 by a fixed connection (or built-in connection). Consequently, this definition excludes retaining solutions involving glue, adhesive tape (for example double sided), O-rings. The fixed connection as described in the remainder of the description may make use of a retaining element 20 forming a single-piece part with another constituent element of the spray nozzle 10, or a retaining element 20 connected to the spray nozzle 10 by attachment means.

Particularly advantageously, the screw 30 comprises a collar 32. "Collar" refers to a ring placed at the base of the screw head 31, and forming a circumferential protuberance. Thus, the screw 30 can advantageously be retained in the spray nozzle 10 at the collar 32 by the retaining element 20.

Alternatively, the screw 30 can be retained in the spray nozzle 10 at the top of the screw head or by a groove formed in the screw head.

In general, a spray nozzle 10 may include a spray nozzle body 11 and an orientation plate 12. In particular, the spray nozzle body 11 is a metal part provided with an oil flow duct, while the orientation plate 12 will orient said conduit relative to the support against which the spray nozzle 10 is held tight.

According to this configuration, the retaining element 20 is connected to the orientation plate 12 through a fixed connection.

Figure 1B:
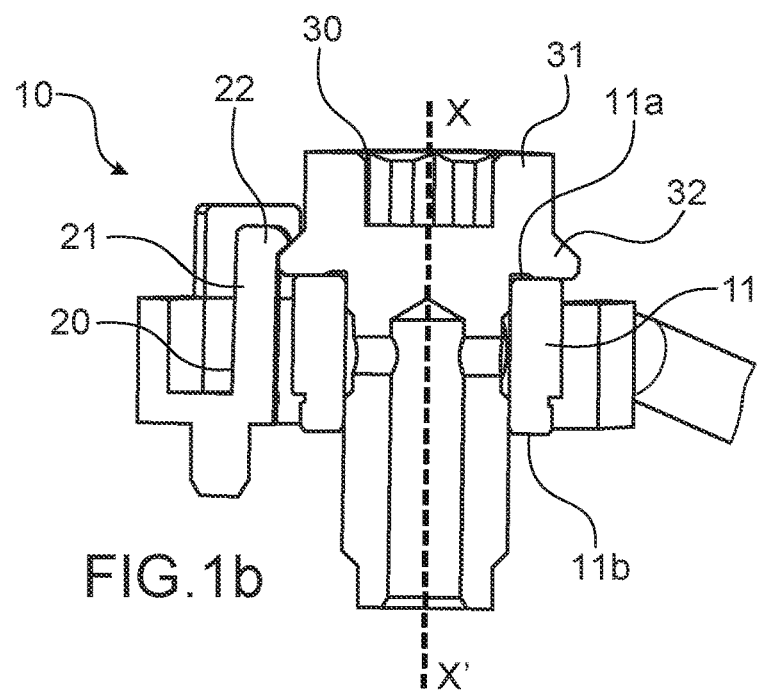
Figure 1C:
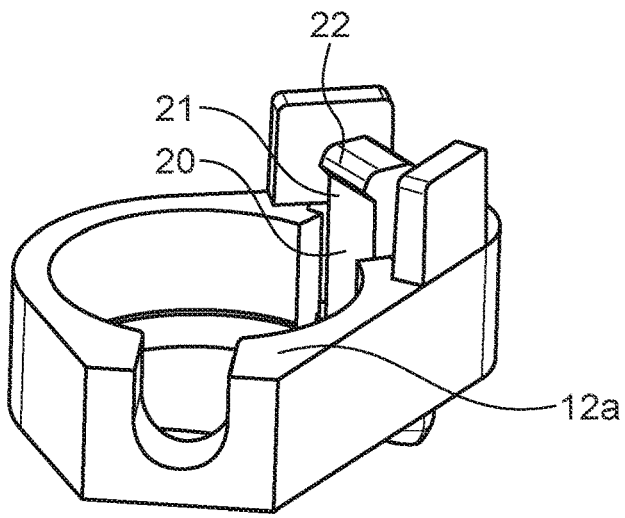
FIG. 1c shows a perspective view of the spray nozzle orientation plate used according to the first embodiment of the invention.

According to a first embodiment illustrated in FIGS. 1a-1c, the spray nozzle body 11 comprises a metal ring in which an axial duct is formed (extending along the XX' axis, FIG. 2b) in which the 30 is engaged.

The orientation plate 12 according to this first embodiment is provided with a hole inside which the spray nozzle body 11 is inserted. It is understood without it being necessary to state it, that the metallic ring is engaged coaxially in said hole.

Advantageously, the retaining element 20 and the orientation plate 12 form a single-piece element. In particular, said single-piece element can be made of plastic, and thus be formed by a moulding process.

In order to tighten the spray nozzle 10 against the support, the screw head 31 bears in contact with an upper face 11a of the spray nozzle ring 11, opposite a lower face 11b of said spray nozzle ring 11 (the lower face 11b of the spray nozzle ring 11 is designed to be in contact with the support against which the spray nozzle 10 is held tight). The orientation plate 12 is shrink fitted and bears against a stop on the spray nozzle ring 11. The orientation plate 12 is held in position between the spray nozzle ring 11 and the support against which the spray nozzle 10 is held tight.

Particularly advantageously, the retaining element 20 comprises at least one clip projecting from the upper face 12a of the orientation plate 12. "Clip" means a beam 21 comprising a free end at which a lateral protuberance 22 is arranged.

Said protuberance 22 is arranged to form the stop that will retain the screw 30 captive to the spray nozzle 10. In other words, the protuberance 22 forms an obstacle against which the collar 32 of the screw head 31 stops.

Thus, during assembly of the screw 30 in the metallic ring, the clip deforms and the protuberance 22 from the clip is positioned on the collar 32 of the screw 30, then creating a retaining point for said screw 30. In other words, the screw is retained by click fitting in the clip.

Moreover, this solution for retaining the screw 30 prevents loss of said screw 30 during manipulations and/or transport, from assembly of the spray nozzle 10 until this spray nozzle 10 is mounted on an engine block.

Moreover this solution, once the clip and the orientation plate 12 form a single-piece element, does not require an additional part to perform this retaining function.

Furthermore, the clip does not hinder tightening of the spray nozzle 10 in contact with the support, and it is possible to unclip the screw 30 without damaging the clip during assembly onto the engine block. Adjusting the length of the beam 21 contributes to leaving axial clearance for the captive screw$. This clearance can be useful when installing the spray nozzle on its support.

Also advantageously, the lateral plates 23 are arranged on each side of the clip and project from the top face 12a of the orientation plate 12. The lateral plates 23 protect the clip and can form a single-piece element with the orientation plate 12.

Furthermore, the orientation plate may include orientation means designed to orient it relative to the surface on which it is placed. In particular, the orientation means can include a pin formed on the lower face 12b of the orientation plate 12, and that will be inserted in an orientation hole on the engine block.

Figure 2A:
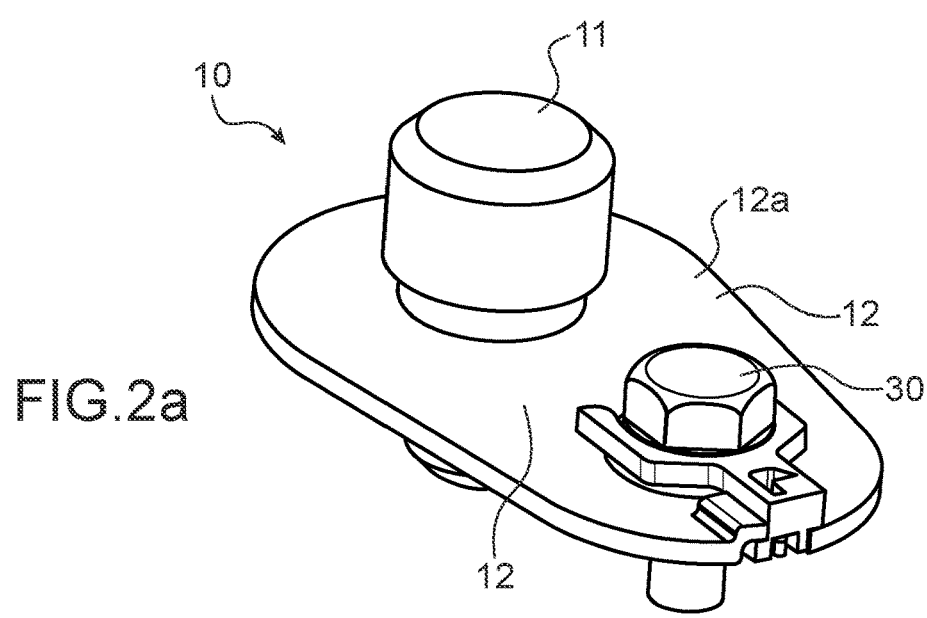
FIG. 2a is a perspective representation of a spray nozzle according to a second embodiment of this invention.
Figure 2B:
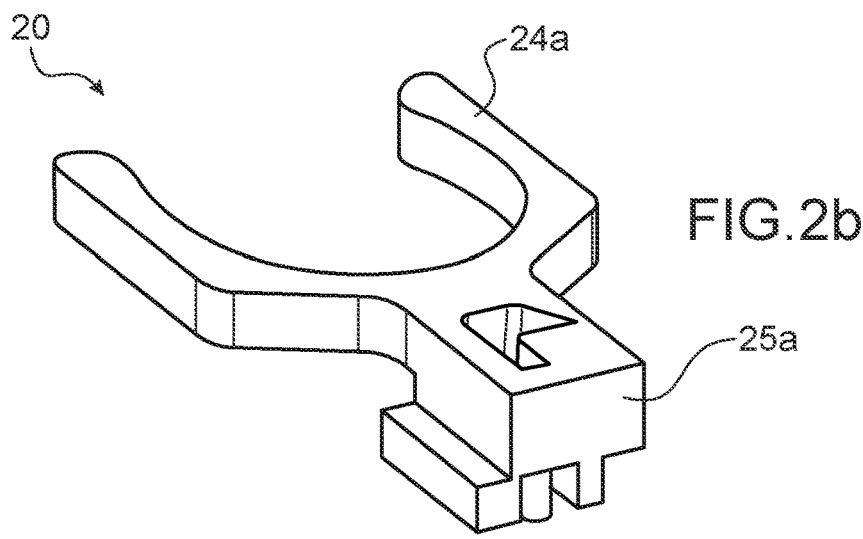
FIG. 2b is a perspective representation of a retaining element used in the second embodiment of this invention.
Figure 2C:
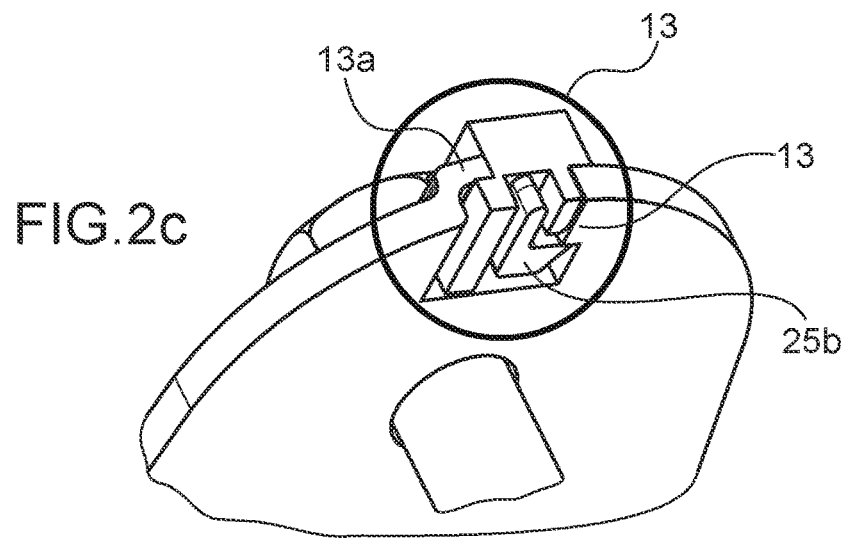
FIG. 2c is a perspective representation of the layout of the retaining element and the slide according to the second embodiment of the invention.
Figure 3A:
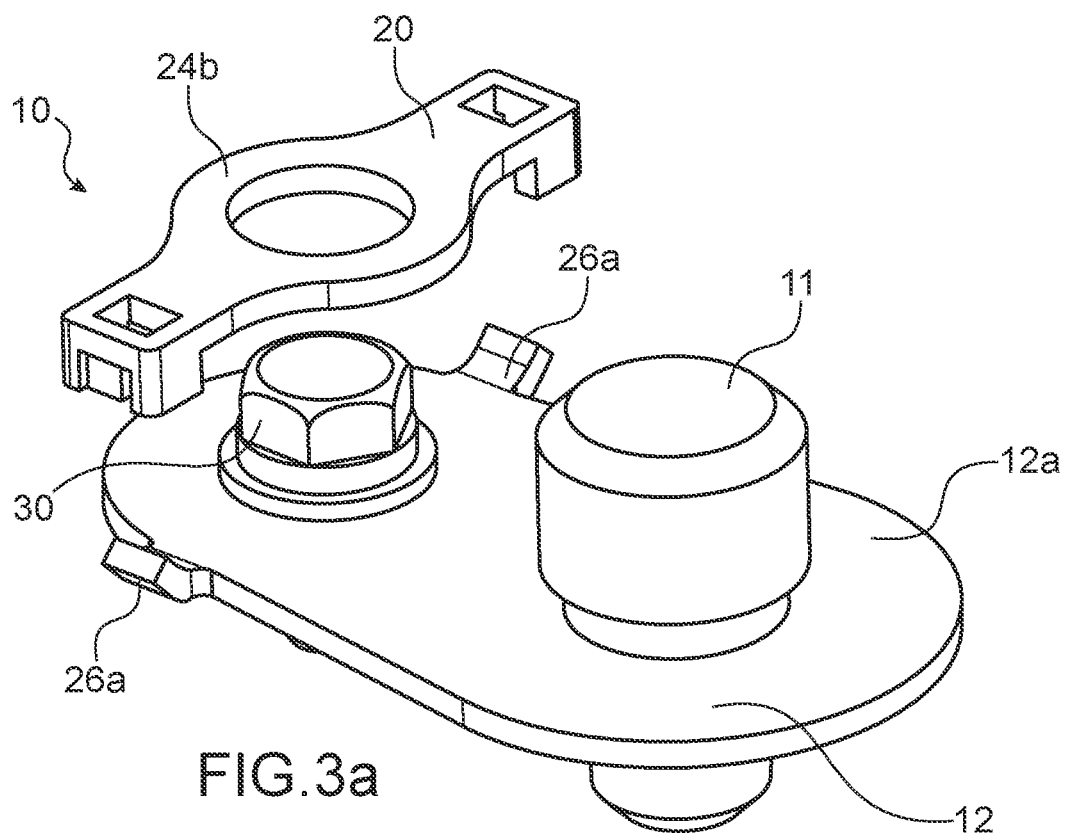
FIGS. 3a and 3b are two representations, in perspective, of the spray nozzle according to a third embodiment of this invention, the retaining element being made according to a first alternative, FIGS. 3a and 3b representing the retaining element disassembled and assembled respectively.
Figure 3B:
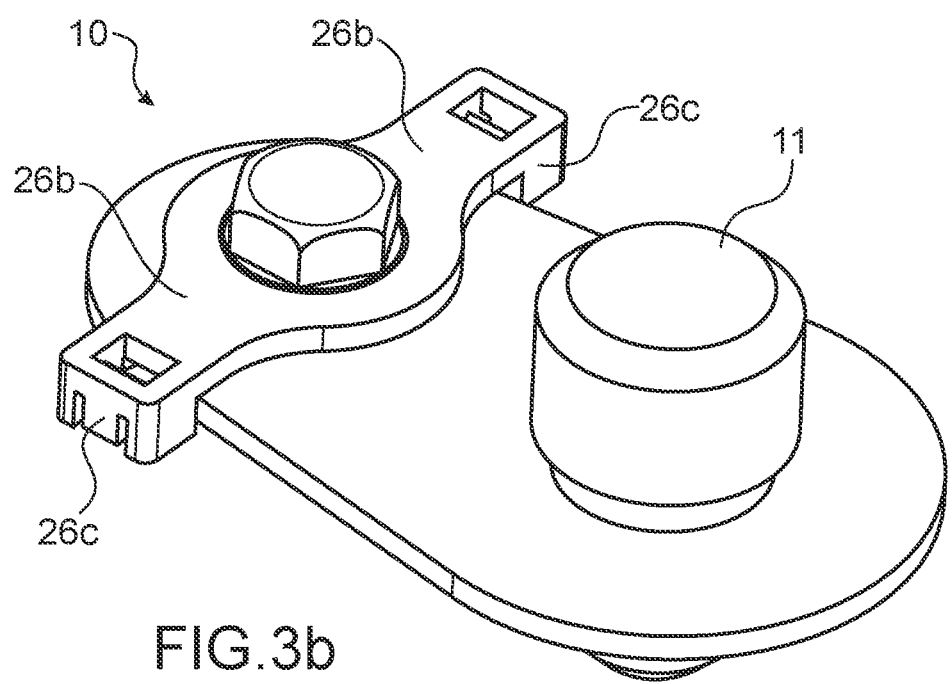
Figure 4A:
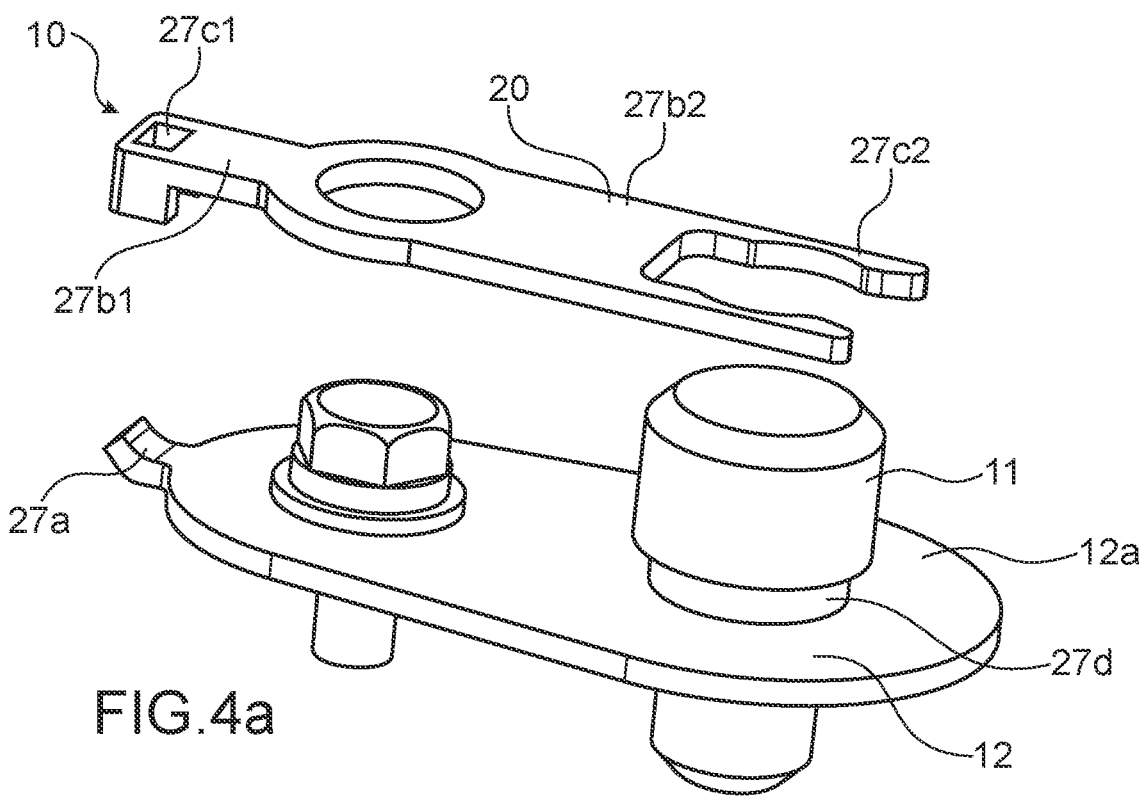
FIGS. 4a and 4b are two representations, in perspective, of the spray nozzle according to the third embodiment of this invention, the retaining element being made according to a second alternative, FIGS. 4a and 4b representing the retaining element disassembled and assembled respectively.
Figure 4B:
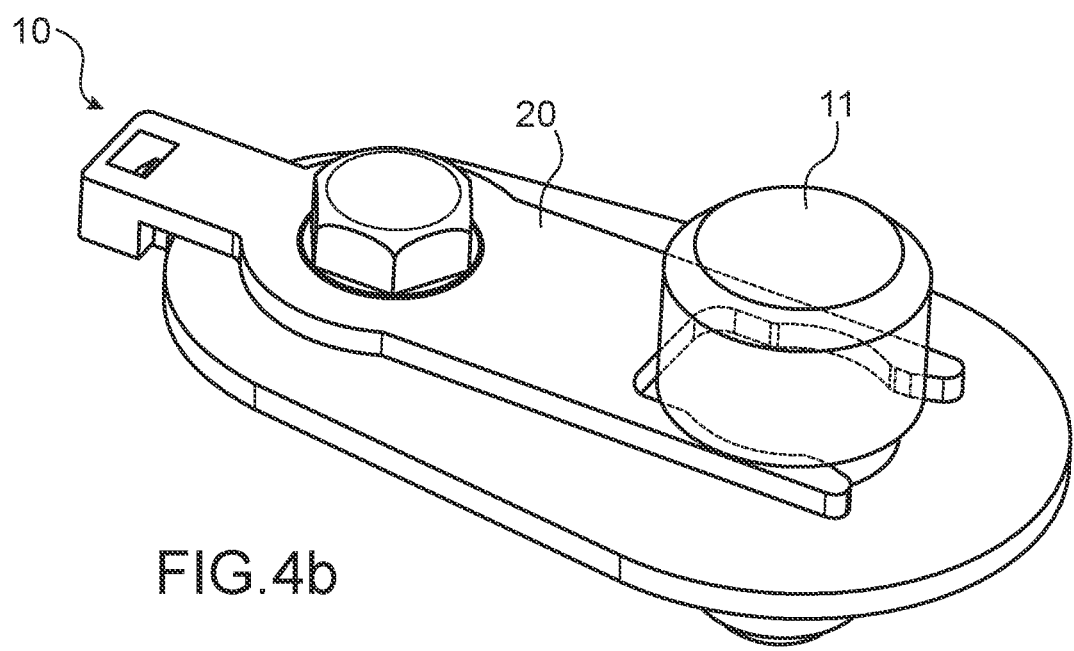

According to a second embodiment illustrated on FIGS. 2a-2c, the screw 30 is offset from the spray nozzle body 11. In other words, the screw 30 is not engaged in the axial channel in the spray nozzle body 11. The orientation plate may contain metal, for example steel.

Furthermore, according to this second embodiment, the retaining element 20 comprises a fork 24a forming the stop that will retain the screw 30 captive to the spray nozzle 10. The fork 24a thus comprises two arms, connected together by a base, and surrounds the screw head 31. Thus, according to this embodiment, the arms of the fork 24a form the stop that will retain the screw 30 captive to the spray nozzle 10. In particular, the arms of the form 24a retain the screw 30 at the collar.

The retaining element 20 may also comprise an attachment section 25a that rigidly fixes said retaining element 20 to the orientation plate. In particular, the attachment section 25a can be inserted in a lateral side formed in the orientation plate 12.

The lateral slide is arranged to guide the two arms of the fork 24a towards the screw head 31.

The lateral slide 13 may include a recess formed in the orientation plate, and extend along a diametric direction of the screw 30.

In particular, the slide 13 comprises two lateral edges arranged to guide the attachment section 25a along the diametric direction of the screw 30. One of the two edges may be stamped over at least part of its length, to form a bearing section 13a projecting from the upper face 12a of the orientation plate 12, the bearing section 13a forming a bearing surface on the attachment section 25a.

Advantageously, the attachment section 25a comprises a locking clip 25b arranged to enable a fixed connection between the retaining element 20 and the orientation plate 12. Still advantageously, a pin cooperating with the locking clip 25b can be arranged at the slide so as to block movement of the retaining element 20. Said pin 13b is advantageously formed on one of the two lateral sides of the slide 13.

Moreover, the layout of the attachment section 25a is not limited to a slide and can also be implemented by a combination of a contained dovetail and a containing dovetail.

According to a third embodiment illustrated on FIGS. 3a, 3b, 4a and 4b, the screw 30 is offset from the spray nozzle body 11, and the retaining element 20 comprises an annular element 24b inside which the screw head 31 is engaged ("annular element" means a washer). Said annular element 24b forms the stop that will retain the screw 30 captive to the spray nozzle 10. In particular, the annular element 24b retains the screw 30 at the collar 32. The annular element 24b is connected to the orientation plate 12 with a fixed connection by attachment means.

According to a first alternative (FIGS. 3a and 3b), the attachment means may include two lateral tabs 26a arranged on the orientation plate 12, and two beams 26b extending from the annular element 24b along two diametrically opposite directions. Each of the two beams 26b comprises a free end at which a clip 26c is arranged, each cooperating with one of the two lateral tabs 26a so as to make a fixed connection between the orientation plate 13 and the retaining element 20.

According to a second alternative (FIGS. 4a and 4b), the attachment means may include one lateral tab 27a aligned with the screw 30 and the spray nozzle body 11, and a first beam 27b1 and a second beam 27b2 extending from the annular element 24b along two diametrically opposite directions. The first beam 27b1 comprises a free end at which a clip 27c1 is arranged cooperating with the lateral tab 27a, the other beam 27b2 also comprises a free end at which an attachment fork 27c2 is arranged cooperating with a circumferential groove 27d formed at an external surface of the spray nozzle body 11. Thus, the attachment fork 27c2 comprises two arms surrounding the spray nozzle body 11 at the groove 27d. The retaining element 20 is then held on the spray nozzle 10 by engaging the attachment fork 27c2 in the groove 27d, and the lateral tab 27a in the clip 27b1.

Figure 5A:
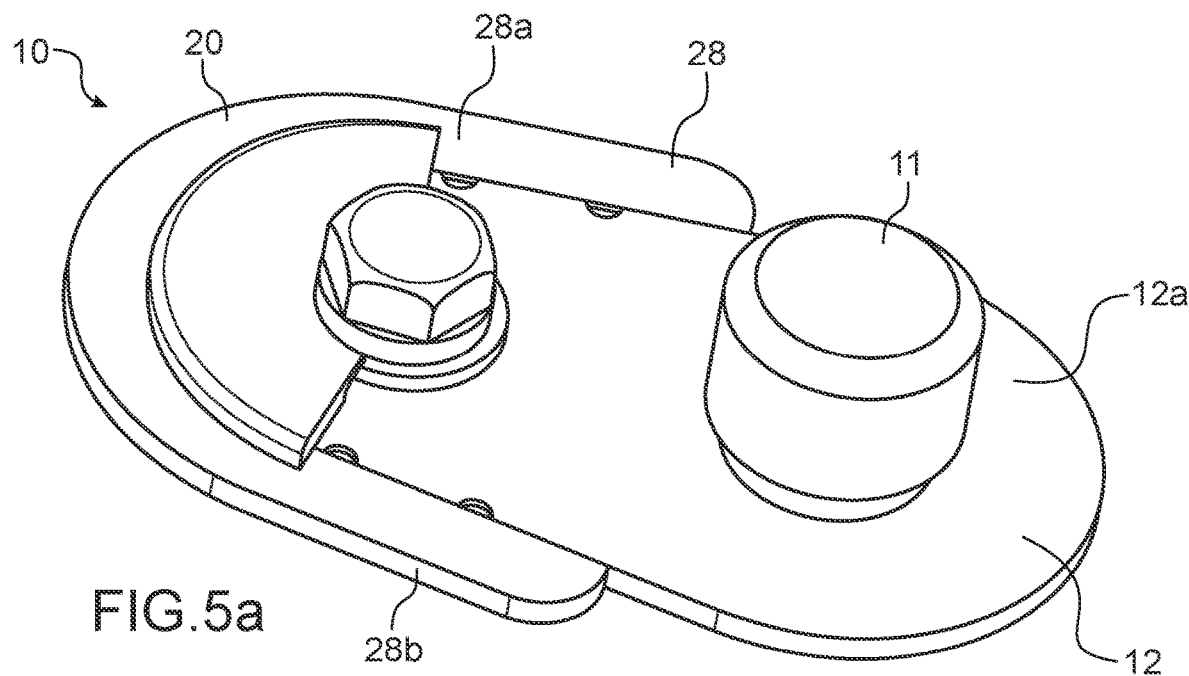
FIGS. 5a and 5b are two representations, in perspective, of the spray nozzle according to a fourth embodiment of this invention, FIGS. 5a and 5b representing the retaining element disassembled and assembled respectively.
Figure 5B:
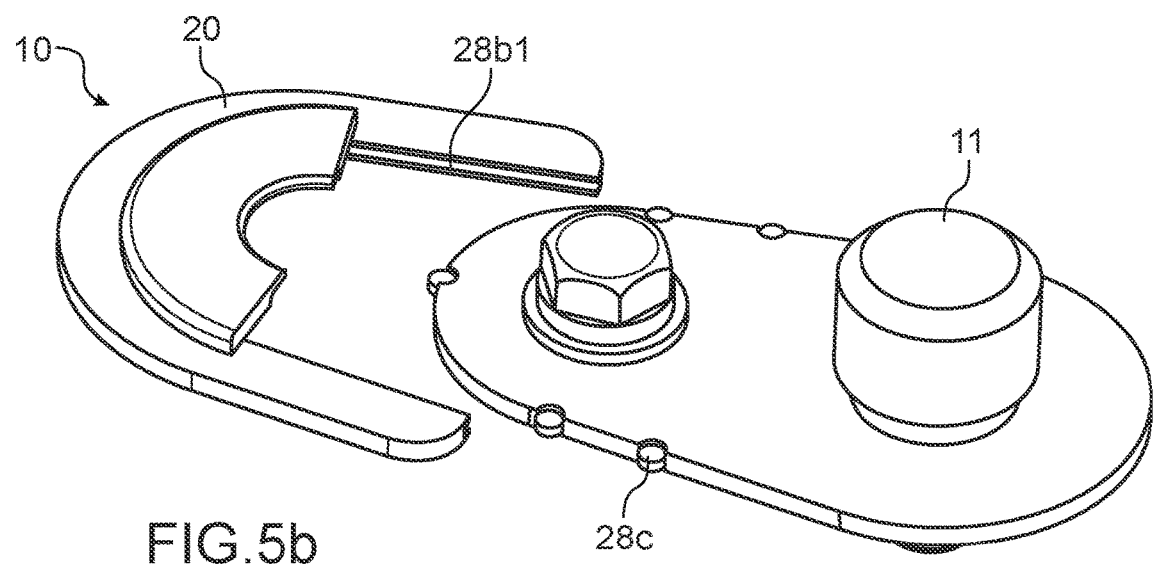

According to a fourth embodiment (FIGS. 5a and 5b), the screw 30 is offset from the spray nozzle body 11, and the retaining element 20 comprises a washer portion adapted to be laterally engaged with the screw 30, and thus form the stop that will retain the screw 30 captive to the spray nozzle 10.

Still according to this fourth embodiment, the retaining element 20 is retained by a fixed connection to the orientation plate 12. In particular, the fixed connection can be made by a generally plane attachment section. The attachment section 28 comprises an upper face 28a and a lower face essentially parallel to each other connected together by a surround 28b. The washer portion is connected to the attachment section 28 by the upper face 28a of said attachment section 28, and partly stops in contact with the upper face 12a of the orientation plate 12. The surround 28b comprises a surround section 28b1 that will be in contact with a peripheral surround section of the orientation plate 12, and has a shape complementary to said peripheral section.

Advantageously, the surround section 28b1 comprises a shoulder that will act as a stop against the pins 28c projecting laterally from the peripheral surround section of the orientation plate 12. It is understood that the stop against the pins is made in the opposite direction to the stop of the annular section against the upper face 12a of the orientation plate 12. In this configuration, the retaining element 20 is then retained by reaction between the collar and the screw head, and by reaction between the shoulder and the pins.

Alternatively, the pins 28c can be replaced by a mating shoulder on the peripheral surround section of the orientation plate 12, said mating shoulder cooperating with the shoulder of the surround section 28b1.

According to the second, third and fourth embodiments, the orientation plate can be made of a metallic material, for example steel.

According to these same embodiments, the screw will not be lost during manipulations of the spray nozzle from assembly until it is mounted on a surface.

Furthermore, the solutions to retain the screw captive to the spray nozzle do not cause any particulate pollution of the engine in which the spray nozzle will be mounted.

The invention claimed is:

1. A captive screw spray nozzle comprising a screw that will retain the spray nozzle on a support, said screw comprising a screw head cooperating with a retaining element, fixed to the spray nozzle, and forming a stop retaining the screw captive on the spray nozzle during assembly of said spray nozzle,
   wherein the screw head comprises a collar or a groove, the retaining element retaining the screw at said collar, and
   wherein the spray nozzle also comprises a spray nozzle body and an orientation plate, the retaining element and the orientation plate being held together by a fixed connection.

2. The captive screw spray nozzle according to claim 1, wherein the spray nozzle body comprises a metal ring in which there is an axial channel in which the screw is engaged, and the orientation plate comprises a hole in which the spray nozzle body is inserted.

3. The captive screw spray nozzle according to claim 1, wherein the retaining element and the orientation plate form a single-piece element.

4. The captive screw spray nozzle according to claim 1, wherein the retaining element comprises at least one clip projecting from an upper face of the orientation plate, the clip comprising a protuberance at a free end arranged to form the stop that will retain the screw captive to the spray nozzle.

5. The captive screw spray nozzle according to claim 4, wherein the orientation plate also comprises two side plates for protection of the clip, projecting from the upper face of the orientation plate and arranged on each side of the clip.

6. The captive screw spray nozzle according to claim 1, wherein the screw is offset from the body of the spray nozzle, and wherein the retaining element comprises a fork forming the stop that will retain the screw captive to the spray nozzle, said fork comprising two arms connected to each other through a base, and surrounding the screw head.

7. The captive screw spray nozzle according to claim 6, wherein the retaining element also comprises a fastening section inserted in a lateral slide formed in the orientation plate.

8. The captive screw spray nozzle according to claim 1, wherein the screw is offset from the spray nozzle body, and wherein the retaining element comprises an annular element inside which the screw head is engaged, forming the stop that will retain the screw captive to the spray nozzle.

9. The captive screw spray nozzle according to claim 8, wherein the orientation plate comprises two lateral tabs, and wherein the retaining element also comprises two beams extending from the annular element along two diametrically opposite directions, each of the two beams comprising a free end at which a clip is arranged, each cooperating with one of the two lateral tabs to make the fixed connection between the orientation plate and the retaining element.

10. The captive screw spray nozzle according to claim 8, wherein the orientation plate comprises a lateral tab, said tab, the screw and the spray nozzle body being aligned, and wherein the retaining element also comprises two beams extending from the annular element along two diametrically opposite directions, one of the two beams comprising a free end at which there is a clip cooperating with the lateral tab, the other beam also having a free end at which there is an attachment fork cooperating with a circumferential groove formed on an external surface of the spray nozzle body.

11. The captive screw spray nozzle according to claim 1, wherein the screw is offset from the spray nozzle body, and wherein the retaining element comprises an annular section adapted to be laterally engaged to the screw and forming the stop that will retain the screw captive to the spray nozzle.

\* \* \* \* \*